United States Patent
Blaine et al.

(10) Patent No.: US 9,772,959 B2
(45) Date of Patent: Sep. 26, 2017

(54) I/O SCHEDULING

(71) Applicant: Apple Inc., Cupertino, CA (US)

(72) Inventors: Russell A. Blaine, San Francisco, CA (US); Kushal Dalmia, Cupertino, CA (US); Joseph Sokol, Jr., San Jose, CA (US); Andrew W. Vogan, Cupertino, CA (US); Matthew J. Byom, San Jose, CA (US)

(73) Assignee: Apple Inc., Cupertino, CA (US)

( * ) Notice: Subject to any disclaimer, the term of this patent is extended or adjusted under 35 U.S.C. 154(b) by 443 days.

(21) Appl. No.: 14/292,123

(22) Filed: May 30, 2014

(65) Prior Publication Data

US 2015/0347327 A1 Dec. 3, 2015

(51) Int. Cl.
*G06F 13/18* (2006.01)
*G06F 3/06* (2006.01)
*G06F 13/38* (2006.01)
*G06F 9/00* (2006.01)

(52) U.S. Cl.
CPC .......... *G06F 13/18* (2013.01); *G06F 3/0611* (2013.01); *G06F 3/0659* (2013.01); *G06F 3/0688* (2013.01); *G06F 9/00* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 3,921,145 A | 11/1975 | Emm et al. | |
| 4,628,447 A | 12/1986 | Cartret et al. | |
| 5,812,799 A | 9/1998 | Zuravleff et al. | |
| 5,847,857 A | 12/1998 | Yajima et al. | |
| 5,867,735 A | 2/1999 | Zuravleff et al. | |
| 6,199,124 B1 | 3/2001 | Ramakrishnan et al. | |
| 6,442,631 B1 | 8/2002 | Neufeld et al. | |
| 6,745,307 B2 | 6/2004 | McKee | |
| 6,810,437 B1 | 10/2004 | Nihei | |
| 6,859,926 B1 | 2/2005 | Brenner et al. | |
| 7,302,686 B2 | 11/2007 | Togawa | |
| 7,565,652 B2 | 7/2009 | Janssen et al. | |
| 7,752,362 B2 | 7/2010 | Nishimoto et al. | |
| 7,895,373 B2 | 2/2011 | Imai | |
| 8,347,296 B2 | 1/2013 | Yasutake | |
| 8,468,534 B2 | 6/2013 | Tunning | |
| 8,566,828 B2 | 10/2013 | Pilkington | |
| 8,640,129 B2 | 1/2014 | Cismas et al. | |

(Continued)

OTHER PUBLICATIONS

Lui Sha et al., "Priority Inheritance Protocols: An Approach to Real-Time Synchronization", IEEE Transactions on Computers, vol. 39, No. 9, Sep. 1990, pp. 1175-1185.

*Primary Examiner* — Idriss N Alrobaye
*Assistant Examiner* — Dayton Lewis-Taylor
(74) *Attorney, Agent, or Firm* — Blakely, Sokoloff, Taylor & Zafman LLP

(57) ABSTRACT

In one embodiment, input-output (I/O) scheduling system detects and resolves priority inversions by expediting previously dispatched requests to an I/O subsystem. In response to detecting the priority inversion, the system can transmit a command to expedite completion of the blocking I/O request. The pending request can be located within the I/O subsystem and expedited to reduce the pendency period of the request.

25 Claims, 10 Drawing Sheets

(56) References Cited

U.S. PATENT DOCUMENTS

| | | | |
|---|---|---|---|
| 2002/0138679 A1* | 9/2002 | Koning | G06F 9/4881 710/244 |
| 2005/0076162 A1 | 4/2005 | Tamura et al. | |
| 2007/0038792 A1 | 2/2007 | Shin | |
| 2009/0254686 A1 | 10/2009 | Jeong | |
| 2010/0082995 A1 | 4/2010 | Dees et al. | |
| 2010/0125848 A1 | 5/2010 | Dadhich et al. | |
| 2010/0281486 A1 | 11/2010 | Lu et al. | |
| 2011/0131346 A1 | 6/2011 | Noeldner et al. | |
| 2011/0213945 A1 | 9/2011 | Post et al. | |
| 2011/0225583 A1 | 9/2011 | Suh et al. | |
| 2012/0079174 A1 | 3/2012 | Nellans et al. | |
| 2012/0173786 A1 | 7/2012 | Simon et al. | |
| 2013/0013835 A1 | 1/2013 | Kurihara et al. | |
| 2013/0332941 A1 | 12/2013 | Ramesh et al. | |
| 2014/0068128 A1 | 3/2014 | Maeda | |
| 2014/0373021 A1* | 12/2014 | Teixeira | G06F 9/5038 718/103 |

\* cited by examiner

I/O SCHEDULING

CROSS-REFERENCE

The present application is related to co-pending U.S. patent application Ser. No. 13/736,846, titled Maintaining I/O Priority and I/O Sorting, filed Jan. 8, 2013, which is hereby incorporated by reference.

The present application is related to co-pending U.S. patent application Ser. No. 13/965,109, titled Managing I/O Priorities, filed Aug. 12, 2013, which is hereby incorporated by reference.

BACKGROUND

In a preemptive multi-threaded operating system, a task can interrupt an executing task of lower-priority. When the higher-priority task completes execution, the lower-priority task can resume execution from the point of interruption. Preemption is an attempt to guarantee a worst-case performance time for high-priority processes to enhance the perceived fluidity and responsiveness for the overall system. However, the use of shared resources in a preemptive multitasking environment can create resource conflicts between the various tasks executing in the environment. Some of these conflicts can result in a priority inversion, in which a low priority task blocks a higher priority task's access to a shared resource. Priority inversions can have various repercussions depending on the type and number of resources in question.

In general, solutions to the priority inversion issue focus on preventing system instability issues. For example, the priority ceiling protocol and the priority inheritance protocol teach designs that seek to prevent a priority inversion from resulting in a deadlock and system crash. However, such solutions do not attempt to resolve potential system responsiveness issues created by priority inversions.

SUMMARY OF THE DESCRIPTION

In one embodiment, I/O priority inversions are addressed using an I/O scheduling system that enables rescheduling of a previously dispatched I/O request when the system detects a priority inversion caused by an I/O request. In response to detecting the priority inversion, a command can be transmitted to expedite the completion of the blocking request. In response to receiving the command, the priority of the request is increased to reduce the pendency period of the request. The request can be located within the I/O subsystem using an identifying tag.

In one embodiment, a data processing system includes multiple electronic components including a one or more processors coupled to a storage device and a memory device, to perform operations for managing input/output (I/O) requests to the storage device. The operations include, in response to receiving a first I/O request associated with a first task having a first priority, mapping a resource to a first virtual memory region of the first task, transmitting, to the storage device, the first request at the first priority, and marking the a resource as busy. The operations can additionally include, after transmitting the first request, receiving a memory access request from a second task having a second priority to access the resource. Moreover, the operations can include, after determining that the resource is busy, transmitting an expedite command to the storage device to increase the priority of the first request.

In one embodiment, an electronically erasable semiconductor memory storage device includes a memory system comprising electrically erasable semiconductor memory to store data, a storage processor coupled to the memory, and a command interface to receive multiple prioritized access requests for the memory. In one embodiment, the storage device additionally comprises a set of queues including at least a first queue and a second queue, where the multiple memory requests received by the command interface are assigned to a queue in the set of queues based on the priority of the access request, and where the first queue is associated with a first priority and the second queue is associated with a second priority. In one embodiment, the storage processor expedites one or more of the multiple prioritized access requests based on an expedite command by transferring the one or more requests from the first queue to the second queue.

The above summary does not include an exhaustive list of all aspects of the present invention. It is contemplated that embodiments of the invention include all systems and methods that can be practiced from all suitable combinations of the various aspects summarized above, and those disclosed below.

BRIEF DESCRIPTION OF THE DRAWINGS

Various embodiments are illustrated by way of example and not limitation in the figures of the accompanying drawings, in which similar references indicate similar elements.

DETAILED DESCRIPTION

Various embodiments and aspects of a data processing system, including associated methods and devices, are described below. Existing responses to data processing system priority inversions generally focus on manipulating processor priority for a process or thread to prevent preemption related deadlocks and do not address potential system responsiveness issues created by priority inversions or the associated response to the priority inversion. Additionally, priority inheritance systems known in the art focus on processor priority and do not account for other prioritized subsystems, such as a prioritized I/O subsystem, which may differ in form and function from a prioritized processing subsystem. Moreover, processor priority elevation does not account for pending requests to other subsystems that were dispatched before the processor priority for the task is elevated.

Figure 1:
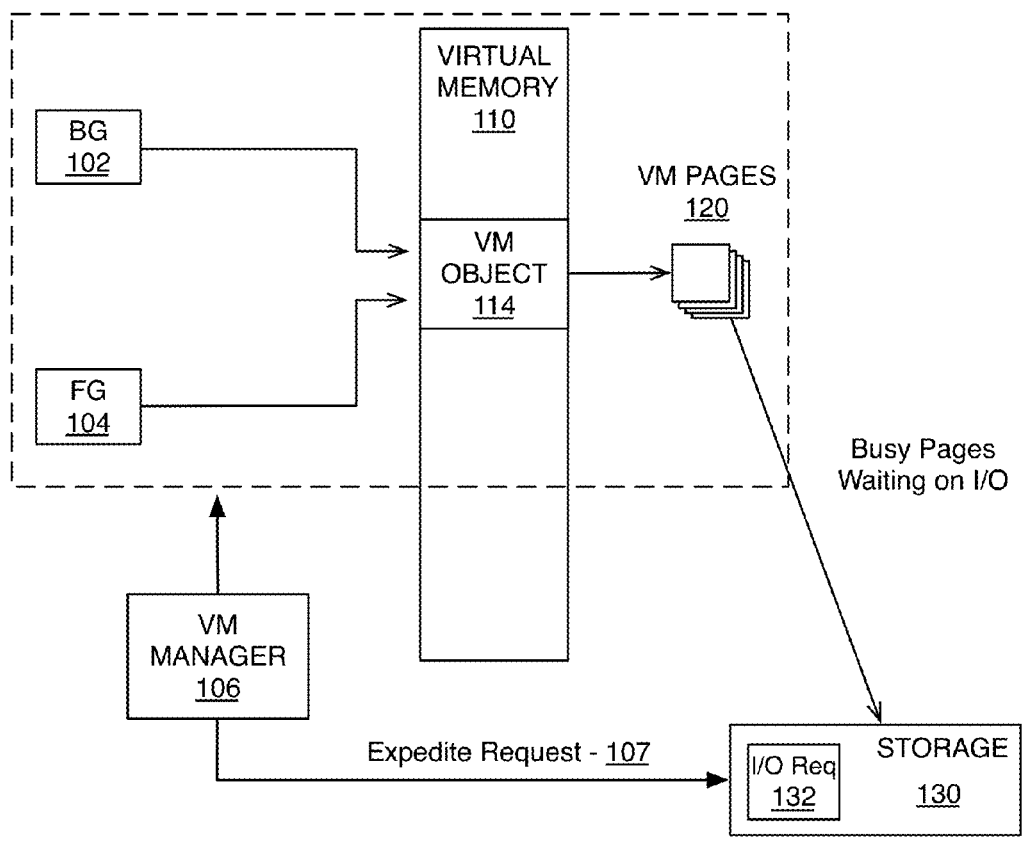
FIG. 1 is a block diagram a virtual memory system configured to detect I/O priority inversions, according to an embodiment.

FIG. 1 is a block diagram of an embodiment of a virtual memory system configured to detect I/O priority inversions. In one embodiment the system includes a background/low priority (BG) process 102, a foreground/high priority (FG) process 104, a virtual memory (VM) manager 106, a region of virtual memory 110, including a shared virtual memory object 114, a set of VM pages 120, and a storage device 130.

The BG process 102 and FB process 104 can each request data from the storage device 130. In one embodiment, when a process makes an I/O request to read data on a storage device, a block of memory is allocated for use during the transfer. The block of memory can be allocated as a contiguous block of physical memory addresses. The physical memory address block is mapped to one or more VM pages 120 in virtual memory 110, when is mapped into a VM object 114 accessible by the process. When the request is serviced, the storage device conducts a direct memory access (DMA) write to the physical memory address block.

There are several ways in which an I/O priority inversion can occur in the virtual memory subsystem. In an example scenario, the BG process 102 makes an input output (I/O) request 132 to read data from the storage device 130, which triggers various memory allocations and mappings associated with the request. If the FG process 104 then requests to write to the same data region while the I/O read request 132 from the BG process 102 is pending, the FG process 104 may be blocked from accessing the data. Alternatively, if the FG process 104 and the BG process are attempting to read the same data, the system can leverage the pending I/O request 132 by mapping the VM object 114 to the FG process 104 instead of performing a duplicate request for the data. In each case, the FG process 104 is blocked pending the completion of the BG process 102 I/O request 132, resulting in a priority inversion.

The FG process 104 dependency on the I/O request 132 made by the BG process 102 may cause a noticeable delay in an application using the FG process 104, particularly when prioritized I/O is used. In one embodiment, the I/O request 132 includes a priority that can be inherited from the requesting process. The priority of the I/O request 132 can influence the pendency period of the request because the lower priority requests may be assumed to be more latency tolerant in comparison to higher priority requests. Accordingly, if the I/O request 132 is initially made as a low priority request, the request may be delayed or preempted numerous times by higher priority requests when pending within the I/O subsystem of the data processing system.

Figure 7:
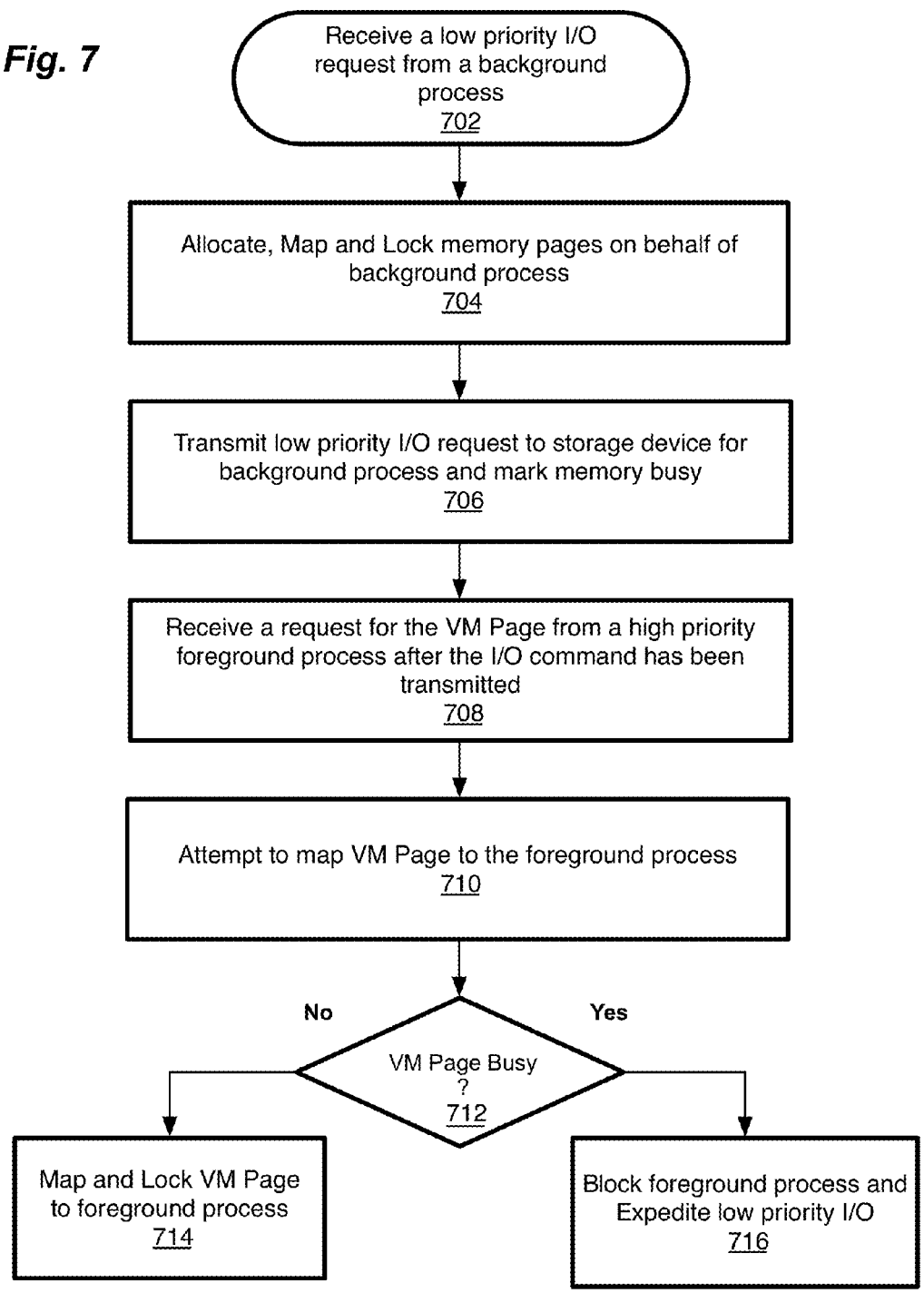
FIG. 7 is a flow diagram of logic to detect a priority inversion, according to an embodiment.

In one embodiment, the VM manager 106 can detect the priority inversion based on virtual memory mappings or requests. In response to detecting the inversion, the VM manager 106 can issue the expedite request on behalf of the blocked or delayed process. Exemplary logic to detect the priority inversion and issue an expedite request is shown in FIG. 7 below.

Figure 2:
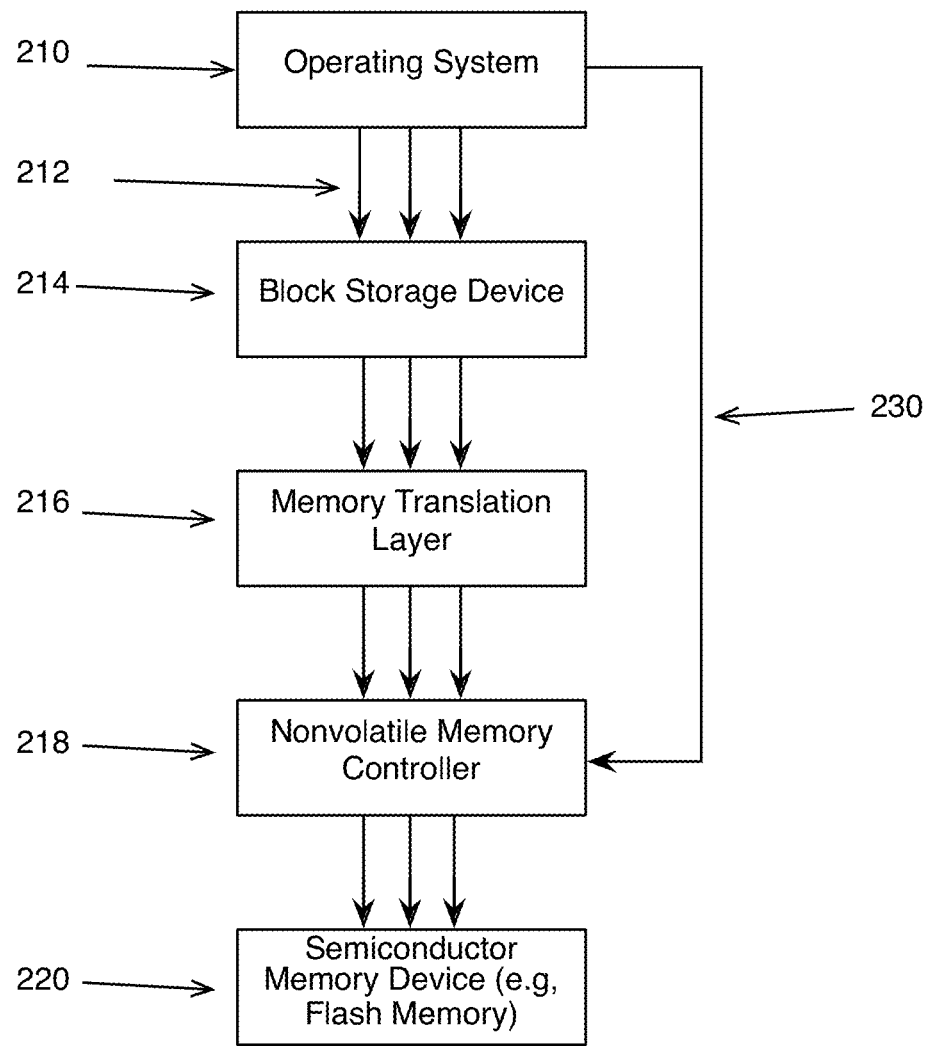
FIG. 2 is a block diagram of an I/O infrastructure of a data processing system, according to an embodiment.

FIG. 2 is a block diagram of an I/O infrastructure of a data processing system, according to an embodiment. The I/O infrastructure includes an operating system 210, a block storage device 214, a memory translation layer 216, a nonvolatile memory controller 218, and a semiconductor memory device 220. The semiconductor memory device 220 can be a flash memory device, such as a NOR based flash device or a NAND based flash device, including single-level-cell or multi-level-cell based solid-state drives (SSD). The semiconductor memory device can be any nonvolatile random access memory (RAM) suitable for data storage.

In one embodiment, I/O requests 212 are dispatched via a set of I/O queues at each component. During system operation the various processes and applications executing on the operating system 210 each dispatch I/O requests at various priority levels. The I/O priority of a request can be maintained throughout the I/O infrastructure, and preemption, out of order completion, throttling, or other priority based processing on the I/O operations may occur at various levels across the I/O subsystem. Alternatively, I/O requests can be processed in first-in-first-out (FIFO) order within software components of the I/O subsystem and priority based optimizations can be limited to the nonvolatile memory controller 218 and/or the semiconductor memory storage device 220.

In one embodiment, an expedite request from a process, task, or module can be evaluated by the operating system 210 to determine whether to issue an explicit expedite command. The request can be evaluated based on one or more parameters including the priority of the blocked application or process, the duration of time between I/O request dispatch and expedite, the priority of the task to expedite, the expected period to process an expedite command, and the system process or I/O load. If the command is to issue, the operating system 210 can send the command to the nonvolatile memory controller 218 as a supervisor I/O command 230 to change the priority of a previously dispatched command. The supervisor I/O command 230 is a system level command that has a higher priority than all I/O commands, requests, or operations dispatched from a user level application, allowing the expedite command to bypass numerous queuing systems to influence the completion time of previously dispatched I/O requests 212 while the requests are pending completion. The supervisor I/O command 230 can be a highly prioritized I/O command that preempts user I/O requests, or can be issued via an out of band communications channel provided by the nonvolatile memory controller 218 or the semiconductor memory device 220.

Figure 3:
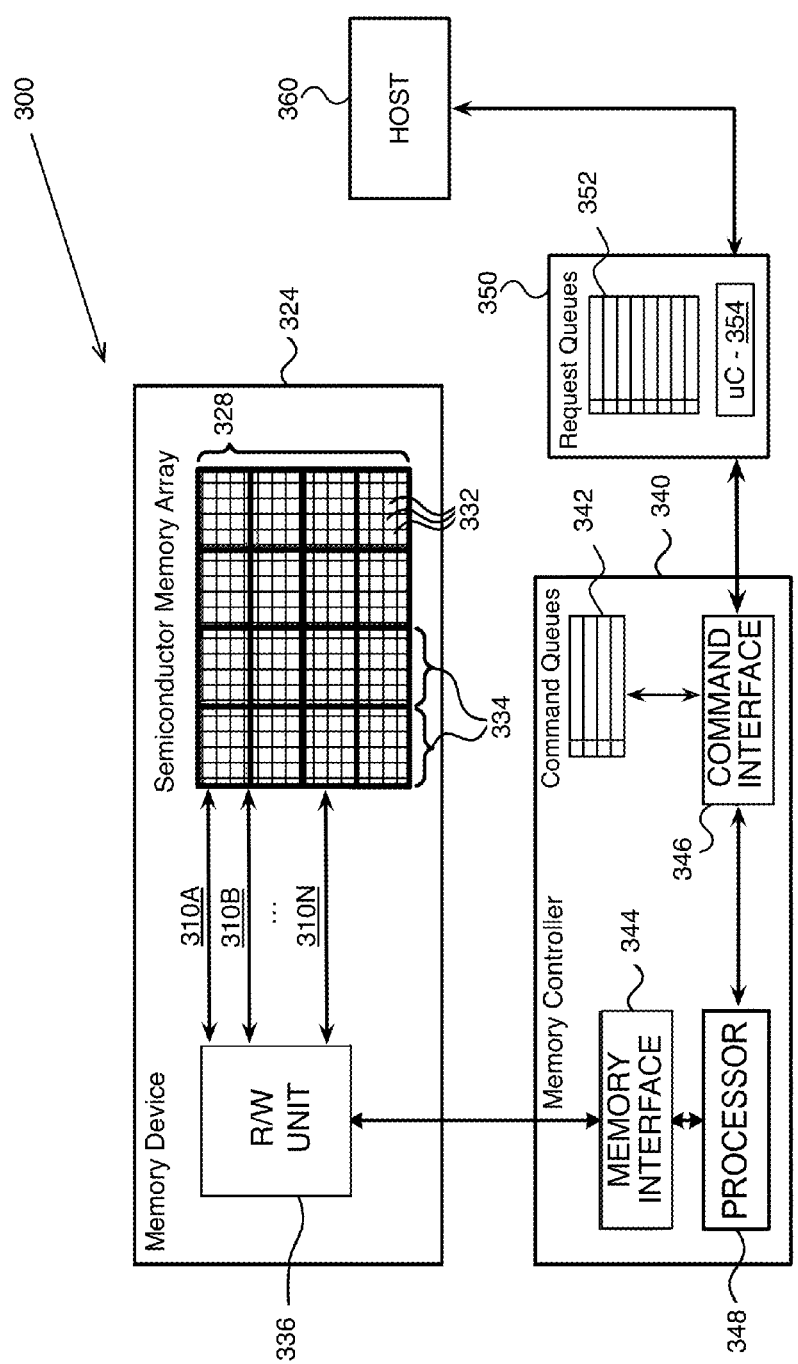
FIG. 3 is an illustration of a nonvolatile memory system, according to an embodiment.

FIG. 3 is an illustration of a nonvolatile memory system, according to an embodiment. The nonvolatile memory device 220 of FIG. 2 can be a variant of the exemplary non-volatile memory system 300. The non-volatile memory controller 218 of FIG. 2 can be an external memory controller or a variant of memory controller 340. The exemplary memory system 300 can be a component of a semiconductor-based memory device that supports expedite commands to elevate the priority of previously dispatched I/O requests. The system 300 can be used in various computing devices or communication devices, such as cellular phones, media players, smartphones, tablet computers, or other computing devices. The system 300 can also be included in an SSD or a hybrid data storage device that combines a hard disk drive (HDD) with one or more SSDs.

The nonvolatile memory system 300 includes a memory device 324, which stores data in a memory cell array 328. The memory array includes multiple semiconductor memory blocks 334, each including multiple memory cells 332. The memory array 328 can be NAND, or NOR flash memory using floating gate MOSFETs, or charge trap flash, or any other form of nonvolatile semiconductor memory. The memory device 324 includes a reading/writing (R/W) unit 336, which converts memory access requests to the memory device into the specific memory block 334 access requests. When reading data out of the array 328, R/W unit 336 converts the stored values in the memory cells 332 into digital samples. Multiple memory access lines 310A-N allow the servicing of multiple concurrent access requests to the semiconductor memory array 328.

A memory controller 340 performs storage and retrieval of data to and from the memory device 324. The memory controller includes a memory interface 344 for communicating with the memory device 324 and a storage processor 348 to perform various memory management functions. The memory controller 340 receives commands via a command interface 346. The commands are stored in one or more command queues 342. The command queues 342 can be included in the memory controller 340 and stored in a bank of volatile memory internal to the memory system 320, or can be stored in memory on a host device 360, as configured by a memory controller driver component of an operating system executing on the host device 360.

Incoming I/O requests form the host 360 can be placed in a set of I/O request queues 352 of a pre-processor 350 before being handled by a micro-controller 354. The micro-controller 354 can process an I/O request in the request queues 352 by issuing one or more memory controller commands to the memory controller 340, or by placing the commands into the one or more command queues 342 of the memory controller. The requests in the request queues 352 can be handled in first in first out (FIFO) order or can be handled out-of-order via a set of weighted deadline priority queues. In one embodiment, each incoming request includes a tag. The tag is an identifier that allows a pending task to be tracked or located within the system. In one embodiment, each component of the memory device 300 can maintain a list of pending requests and their queue location within the system. The micro-controller 354 can be configured to handle an incoming expedite command for a previously received request by referencing the request using the tag associated with the request, and expediting the completion of the request by, for example, increasing the priority of the request.

It will be understood that elements of the nonvolatile memory system 300 that are not necessary for understanding the I/O scheduling system described herein, such as various interfaces, addressing circuits, timing and sequencing circuits and debugging circuits, have been omitted for clarity.

Figure 4:
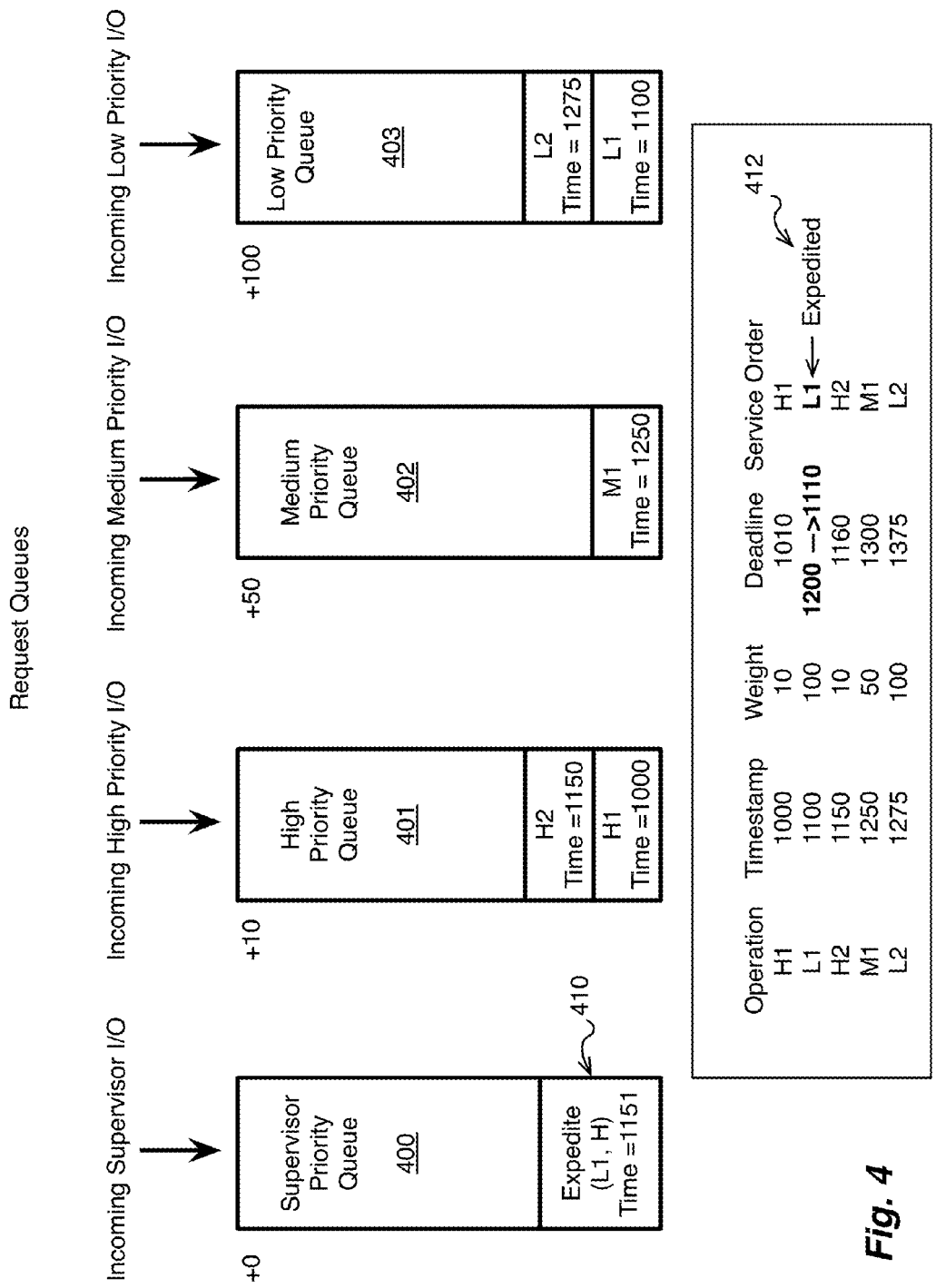
FIG. 4 is an illustration of an expedite command within a set of I/O request queues, according to an embodiment.

FIG. 4 is an illustration of an expedite command within a set of I/O request queues, according to an embodiment. The I/O request queues can be the request queues 352 of the memory system 300 of FIG. 3. In one embodiment, a high priority queue 401, a low priority queue 402, and a medium priority queue 403 accept incoming prioritized I/O requests from user-space processes. The user-space request queues can be addressed in a round-robin fashion, where each queue is addressed sequentially. One or more commands in the high priority queue 401 can be processed, followed by one or more commands in the medium priority queue 402, followed by the low priority queue 403, followed by the high priority queue, 401, etc. In one embodiment, a supervisor queue 400 is available to accept system level requests, such as an expedite command for a pending I/O request. The specific priorities used by the queues are exemplary, and fewer priorities or more priorities than those illustrated can be used without departing from the spirit of the description.

In one embodiment, a weighted deadline system is used in addition to priority based queuing to provide a worst-case deadline by which an I/O request will be handled, processed or pre-processed. In such embodiment, each incoming command is marked with a timestamp for the time when the I/O command is received and a weight value assigned to the priority queue in which the command is placed is added to the timestamp to determine the deadline. For additional description of the use of weighted deadline queues, see co-pending U.S. patent application Ser. No. 13/736,846, titled Maintaining I/O Priority and I/O Sorting, filed Jan. 8, 2013.

In the example shown in FIG. 4, the high priority queue 401 has a weight of +10, the medium priority queue 402 has a weight of +50, and the low priority queue has a weight of +100, though these weights are for exemplary purposes. Illustrated are a first high priority request H1, with an example timestamp of 1000; a low priority request L1, with an example timestamp of 1100; a second high priority request H2, with an example timestamp of 1150; a medium priority request M1, with a timestamp 1250; and a second low priority request L2, with a timestamp of 1275. In one embodiment, the queues are addressed in round-robin fashion, where waiting I/O requests are processed in sequence. If an expedite command is received in the supervisor queue 400, the specified I/O request can be handled out of order.

An expedite command 410 can be received via the supervisor queue. The expedite command 410 can have a timestamp (e.g., 1151) and specify an identifier of the request to expedite and the priority of the expedite command. In one embodiment, the priority of the expedite command is the priority of the task or process that issues the expedite command. The expedite command causes a previously queued task to complete earlier than previously scheduled. For example, the L1 task has an incoming time stamp of 1100 and is in a low priority queue 403 having a weight of 100. Without an expedite command, the completion deadline for L1 is 1200. However, the expedite command 410 causes expedited service 412 of L1 based on the priority included in the expedite command.

Figure 5:
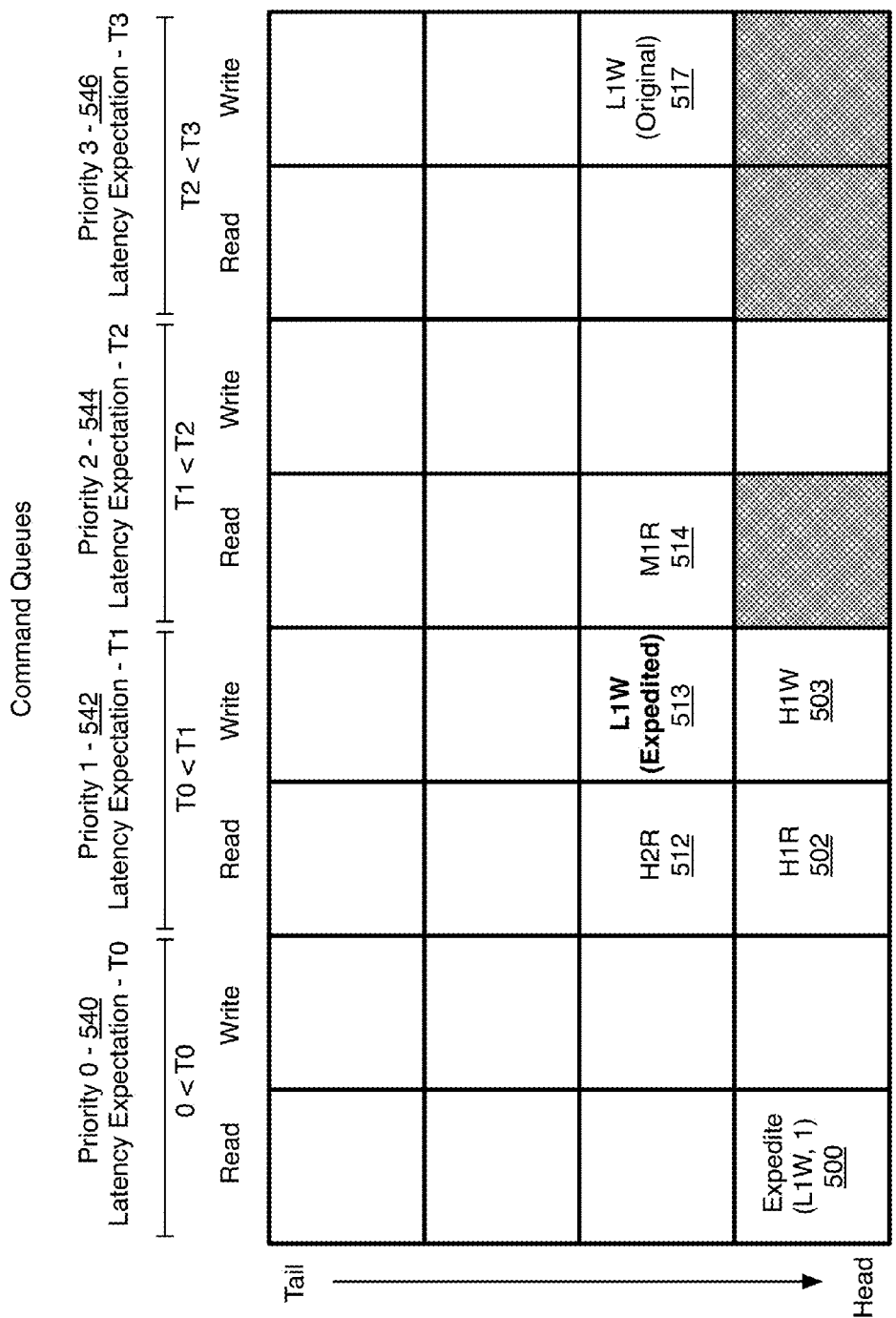
FIG. 5 is an illustration of an expedite command within a set of storage device command queues, according to an embodiment.

FIG. 5 is an illustration of an expedite command within a set of storage device command queues, according to an embodiment. In one embodiment, the command queues are part of a command queuing and processing system that can be employed in a memory controller (e.g., memory controller 318 of FIG. 3, memory controller 340 of FIG. 3) to queue incoming storage processor commands. In one embodiment, the command queuing system is used for the command queues 342 of FIG. 3. In one embodiment, four sets of priority queues are shown, a set of priority zero queues 550, as well as priority one queues 542, priority two queues 544, and priority three queues 546. Priority zero is analogous to a supervisor priority, where priority one, two and three correspond to high, medium and low respectively. The priorities shown are exemplary, and the command queues can be implemented with more than or fewer than the number of priorities shown.

In one embodiment, the memory controller implementing the command queuing system provides a quality of service (QoS) feature to facilitate an estimated worst-case latency for I/O tasks at each priority. Priority zero 540 tasks having the lowest latency expectation between 0 and T0, priority one 542 tasks having a latency expectation between T0 and T1, priority two 544 tasks having a latency expectation between T1 and T2, and priority three 546 having a latency expectation between T2 and T3, where T0, T1, T2, and T3 are each adjustable based on a programmable expectation table. Where QoS expectations are in place, low-priority I/O commands may be delayed for up to a defined period of time to accommodate the expectations for higher priority applications. Expediting previously dispatched I/O tasks during a priority inversion can prevent the potential delays imposed on lower priority I/O from impacting blocked higher priority processes. For additional description of QoS command queuing for semiconductor memory, see co-pending U.S. patent application Ser. No. 13/965,109, titled, Managing I/O Priorities, filed Aug. 12, 2013.

The command queues include a set of exemplary pending tasks, such as a first high priority read task (H1R) 502, a first high priority write task (H1W) 503, a second high priority read task (H2R) 512, and a first medium priority read task (M1R) 514. An additional write task L1W (original) 517, is originally queued as a low priority (e.g., Priority 3) write. Other tasks may also be present, as represented by the hatch line queue elements.

In one embodiment, an expedite command 500 entering the command queues is processed at the highest possible priority and can preempt other pending commands. The expedite command 500 indicates that task L1W (original) 517 is blocking a high priority (e.g., priority one 540) task. In response to the expedite command task L1W 517 is elevated to L1W (Expedited) 513 until the task is handled, processed, or otherwise completed. To expedite the task, the task can be moved in the memory space of the queue system or copied between queues. Where the task is copied, the original task can be removed when the expedite task is processed or maintained in the queuing system and removed when the expedited task is complete. The task can be located using a tracking tag associated with the task. In one embodiment, the task can be directly indexed and retrieved using the tracking tag. In one embodiment, a data structure of pending tasks is maintained and the task may be located by traversing the data structure.

Figure 6:
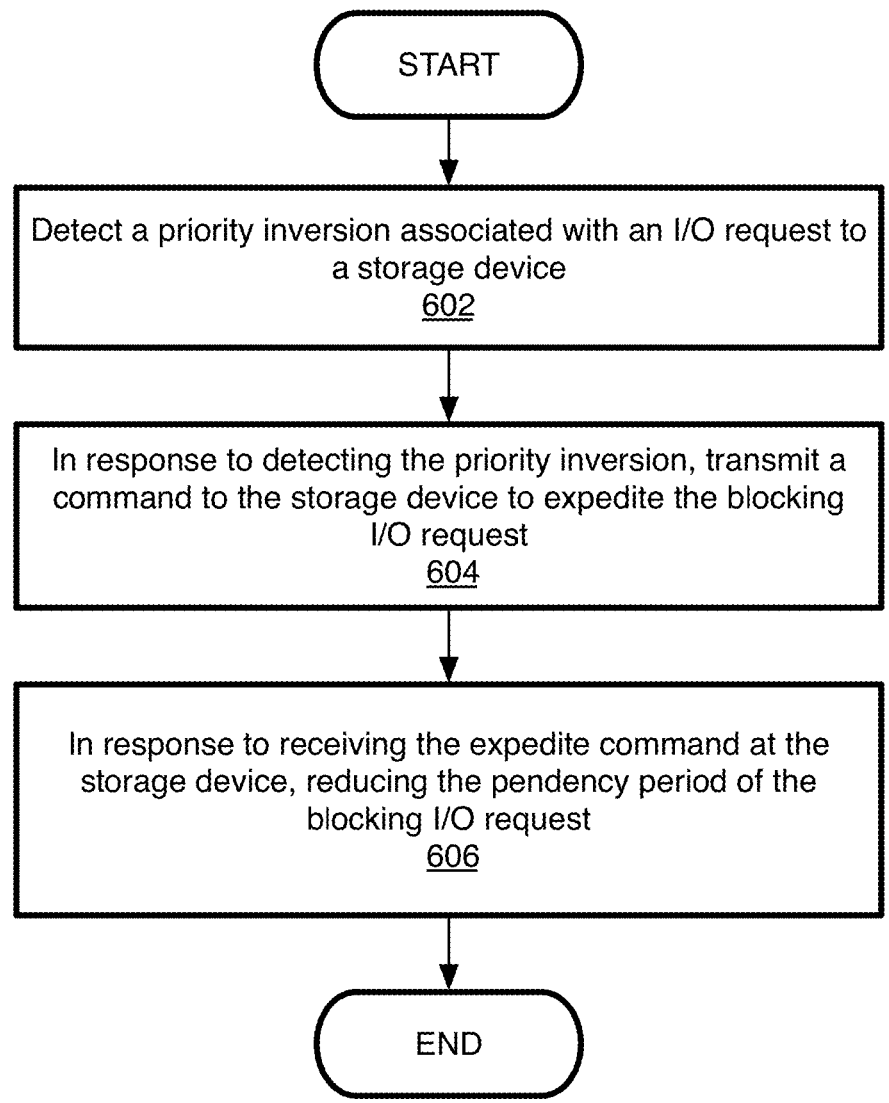
FIG. 6 is a flow diagram of logic to expedite an I/O request in response to a detected priority inversion, according to an embodiment.
Figure 8:
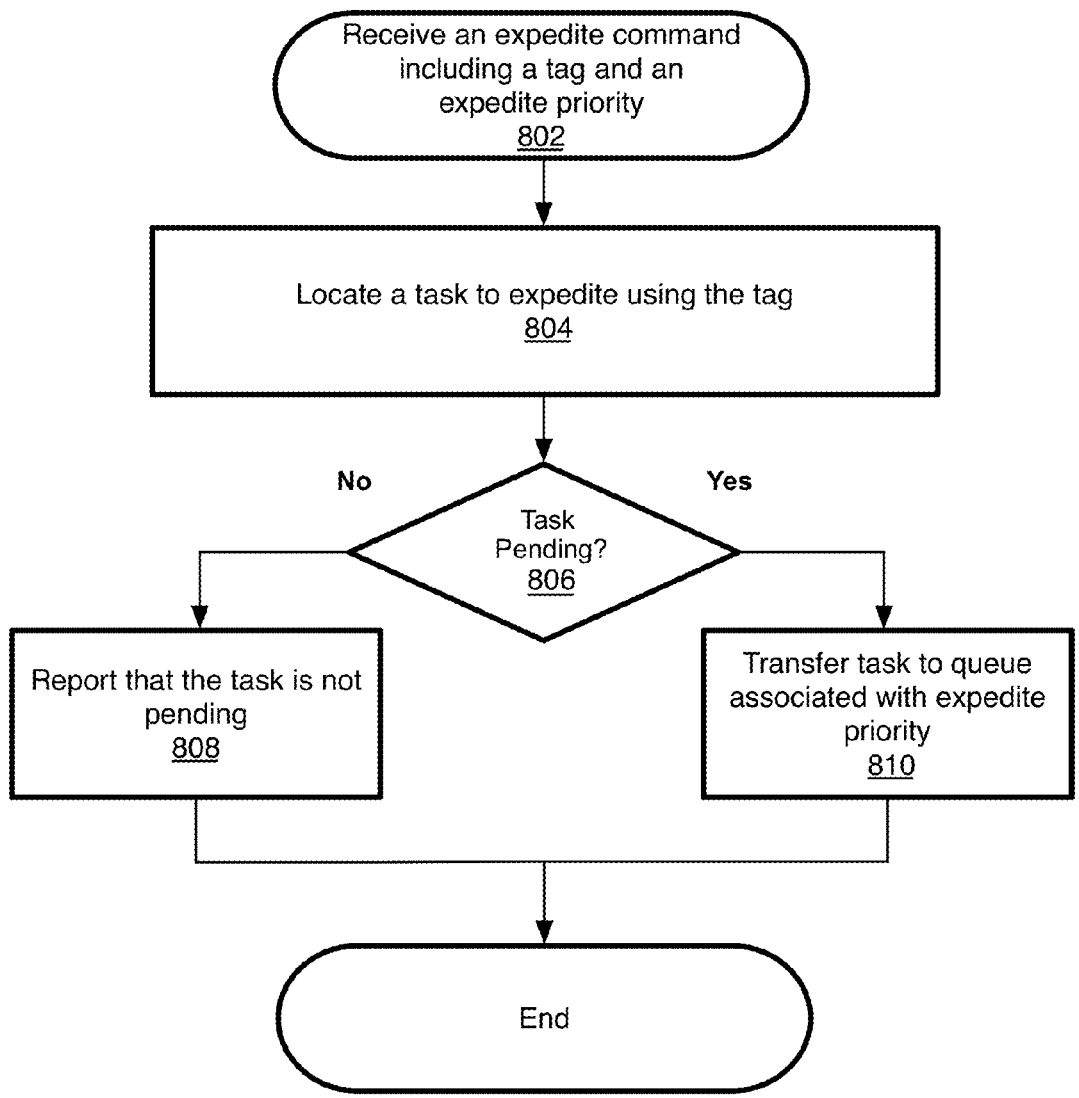
FIG. 8 is a flow diagram of logic to perform an expedite command, according to an embodiment.

FIGS. 6-8 are flowcharts illustrating exemplary logic that can be employed to implement the various I/O scheduling operations described herein. The operations depicted can be performed by processing logic comprising hardware (e.g. circuitry, dedicated logic, etc.), software (as instructions on a non-transitory machine-readable storage medium), or a combination of hardware and software. Although the processes are described below in terms of some sequential operations, it should be appreciated that some of the operations described may be performed in a different order. Moreover, some operations may be performed in parallel rather than sequentially.

FIG. 6 is a flow diagram of logic to expedite an I/O request in response to a detected priority inversion, according to an embodiment. While a virtual memory based method of detecting and expending priority inversions is exemplary of an embodiment of the system described herein, departures from the precise system may be made while maintaining the spirit of the description. Other means for detecting a priority inversion may be used before expediting previously dispatched I/O requests caused by the priority inversion. Logic to perform such detection can reside in one or more modules of an operating system for a data processing system, including a memory management module, an I/O management module, a storage device management module, or any other suitable module having visibility into the operations of multiple user level tasks, processes, threads, or operations.

For example, a data processing system can detect a priority inversion associated with an I/O request to a storage device, as shown at block 602. In response to detecting the priority inversion, the data processing system can transmit a command to the storage device to expedite the I/O request that is blocking the high priority application, as shown at block 604. In response to receiving the expedite command at the storage device, as shown at block 606, the storage device reduce the pendency period of the request by, for example, increasing the priority of the blocking I/O request, causing a deadline for the request to expire, or adjusting a latency expectation for the task. In one embodiment, the blocking I/O request is located in the I/O subsystem using a tracking tag before the task is expedited.

FIG. 7 is a flow diagram of logic to address a priority inversion detected via virtual memory mapping requests, according to an embodiment. A virtual memory manager in a virtual memory subsystem of a data processing system, such as the VM manager 206 of FIG. 2, can detect an I/O priority inversion where a task, process, thread, or other workload associated with a high priority application is blocked or delayed by a lower priority workload.

In one embodiment, an I/O subsystem of the data processing system can receive a low priority I/O request from a background process, as shown at block 702. In response to the I/O request, the I/O subsystem can allocate, map and lock memory on behalf of the background process, as shown at block 704. The I/O subsystem can then transmit a low priority I/O request to the storage device, as shown at block 706, and the storage device can be configured to perform a DMA to or from the memory pages. When the I/O request is pending, the memory pages can be marked as busy.

After transmitting the I/O command, the I/O subsystem can receive a request to access the busy VM pages from a high priority foreground process, as shown at block 708. The foreground process may be attempting to access the VM page due to a resource contention, or because the foreground process is to have access to data previously mapped to or requested by the background process. As shown at block 710, the foreground process, or the VM manager on behalf of the foreground process, can attempt to map the VM page to the memory space of the foreground process, or to a memory region shared between the foreground and background process. If, at block 712, the VM manager determines that the VM page requested by the foreground process is busy or otherwise unavailable, the foreground process suspends (e.g., blocks) execution. The page may be marked as busy for the duration of the I/O request transmitted at block 706. Thus, the VM manager can issue a command to expedite the previously dispatched I/O request, as shown at block 716. Alternatively, if the VM page is available when the foreground process attempts to access the page, the VM manager can map and lock the VM page to the foreground process, as shown at block 714.

FIG. 8 is a flow diagram of logic to perform an expedite command, according to an embodiment. In one embodiment, the I/O subsystem receives an expedite command including a tag and an expedite priority, as shown at block 802. The system can locate the task to expedite using the tag, as shown at block 804. In one embodiment, the system can determine the portion of the I/O subsystem that is processing the task and edit the task priority before the task is queued in the storage device. In one embodiment, the expedite operations are performed on the storage device or a device controller coupled to the storage device controller. In one embodiment, a storage device driver can perform at least a portion of the operations.

In one embodiment, the I/O subsystem determines if the task to expedite is pending within the I/O subsystem, as shown at block 806. It is possible that a task may complete before the system can expedite the task. As shown at block 808, if the task is no longer pending, the system can report the task status, including that the task is already complete, has failed, or is otherwise not pending. If the task is pending on the system, and the task has been located by the system, the system can transfer the task to a queue associated with the indicated expedite priority, as shown at block 810. The system may substantially end processing after the operations shown in block 808 and block 810, although the system may also report, indicate, or otherwise signal completion of the expedite command.

The system can also expedite the task according to alternative methods of hastening the completion of the task, including triggering the expiration of the task deadline if the task is in a weighted deadline queue or adjusting the latency expectation period associated with the task, each of which will cause the task to be processed out of order or in an otherwise expedited manner. If throttling parameters are available for the task, the system can modify those parameters. In one embodiment, an operational mode for the storage device can be adjusted to cause the pendency period for the task to be reduced.

Figure 9:
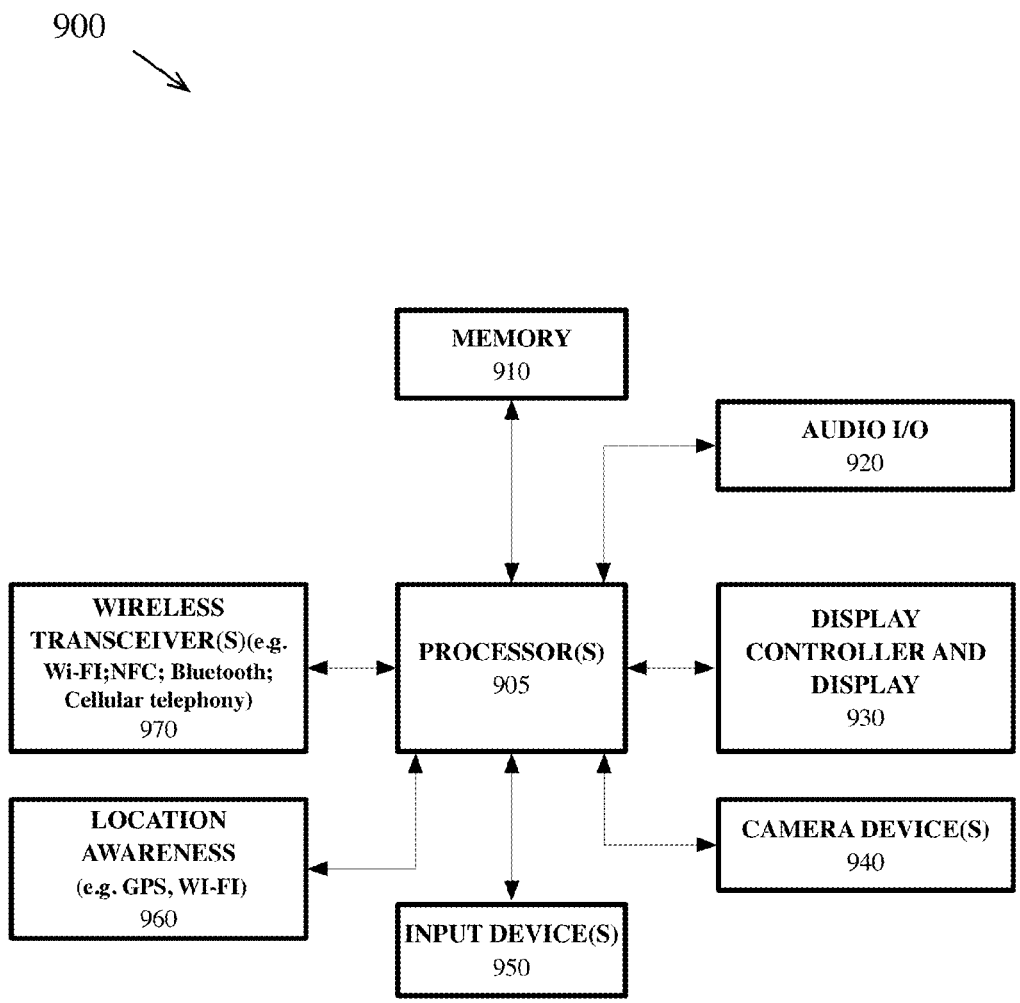
FIG. 9 is a block diagram of an exemplary data processing system, according to an embodiment.

FIG. 9 shows a block diagram illustrating an exemplary data processing system suitable for use in a mobile or handheld device, according to an embodiment. The data processing system 900 may be a system on a chip integrated circuit suitable for use in handheld or mobile devices. One or more buses or interfaces that are not shown can be used to interconnect the various components, as known in the art. An electronic device constructed using the illustrated data processing system 900 may include additional or fewer components than shown.

The system can include a processing system 905 having one or more microprocessors, and memory 910 for storing data and programs for execution by the processing system 905. An audio I/O subsystem 920 is included, which may include a microphone and a speaker for playing back music. The audio I/O subsystem 920 can also provide telephone functionality through the speaker and microphone.

A display controller and display device 930 can be included to provide a graphical user interface for the user, and a wireless transceiver 970 may be available to transmit and receive data via one or more wireless technologies, such as Wi-Fi, infrared, Bluetooth, or one or more variants of wireless cellular technology. The system 900 can contain one or more camera devices 940 in both a front and rear facing configuration, though similarly configured systems each with only a front facing camera or rear facing camera can be one of many optimal configurations. The data processing system 900 also includes one or more input devices 950 to enable a user to provide input to the system. Input devices may include a keypad or keyboard, alone or in conjunction with a touch or multi touch panel that is overlaid on the display device 930. The data processing system 900 can also include a device for providing location awareness services, such as a Global Positioning System (GPS) device 960 or its equivalent. The display device, touch panel and GPS device can be adjusted using factory-generated calibration data that is generated by the module integrator for those components.

Figure 10:
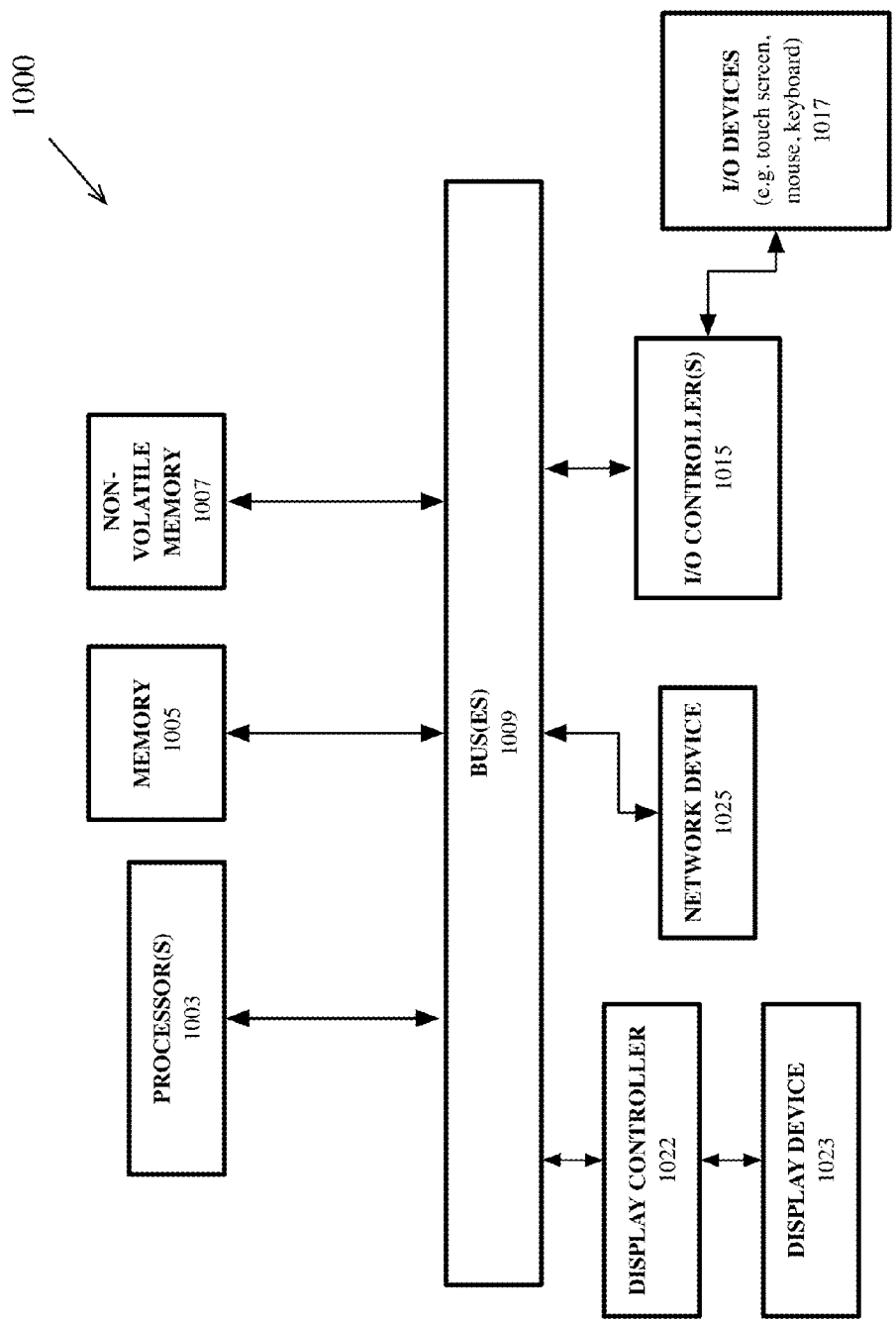
FIG. 10 is a block diagram of an additional exemplary data processing system, according to an embodiment.

FIG. 10 shows a block diagram illustrating an additional exemplary data processing system suitable for use within a workstation, a mobile workstation or a server, according to an embodiment. The data processing system 1000 includes one or more buses 1009, which serve to interconnect the various components of the system. One or more processors 1003, each containing one or more processor cores, are coupled to the one or more buses 1009 as is known in the art. Memory 1005 may be volatile Sequential DRAM, nonvolatile RAM or may be flash memory or other types of semiconductor memory. The memory 1005 is coupled to the one or more buses 1009 using techniques known in the art.

The data processing system 1000 can also include nonvolatile memory 1007 for data storage, which may be a hard disk drive, flash memory, optical memory, or other types of memory systems that maintain data after all power is removed from the system. The nonvolatile memory 1007 and the memory 1005 can both couple to the one or more buses 1009 using known interfaces and connection techniques. A display controller 1022 is coupled to the one or more buses 1009 in order to receive display data to be displayed on a display device 1023. The display device 1023 can include an integrated touch input to provide a touch screen. The data processing system 1000 can also include one or more I/O controllers 1015 to provide interfaces for one or more I/O devices, including touch screens, touch pads, joysticks, one or more mouse inputs, and other input devices including those known in the art. The I/O controller can also provide interfaces for one or more output devices (e.g., speakers). The input/output devices 1017 are coupled through one or more I/O controllers 1015 as is known in the art. Additionally, one or more network interfaces 1025 can also be coupled to the one or more buses to provide access to one or more networks.

While FIG. 10 shows that the nonvolatile memory 1007 and the memory 1005 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 1009 may include one or more bridges or controllers or adapters to interconnect between various buses. In one embodiment, the I/O controller 1015 includes a USB adapter for controlling USB peripherals and can control an Ethernet port or a wireless transceiver or combination of wireless transceivers.

The techniques and methods described herein may be carried out in a data processing system in response to its processor executing a sequence of instructions contained in a volatile, non-transitory memory such as the memory 1005 or the nonvolatile memory 1107 or a combination of such memories. In various embodiments, hardwired circuitry may be used in combination with software instructions, thus the techniques are not limited to any specific combination of hardware circuitry and software or to any particular source for the instructions executed by the data processing system.

Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry. Thus the techniques are not limited to any specific combination of hardware circuitry and software, or to any particular source for the instructions executed by the data processing system associated an apparatus for performing one or more of the operations described herein.

In the specification and figures, various embodiments, methods, systems or devices for I/O scheduling have been described, which include detecting a priority inversion in a data processing system and resolving the priority inversion via an expedite command to expedite the completion of the a blocking I/O operation. The specification and drawings are to be regarded in an illustrative rather than a restrictive sense. Numerous specific details are described to provide a thorough understanding. However, in certain instances, well-known or conventional details are not described in order to provide a concise discussion. Reference in the specification to "one embodiment" or "an embodiment" means that a particular feature, structure, or characteristic described in conjunction with the embodiment can be included in at least one embodiment of the invention. However, the appearance of the phrase "in one embodiment" in various places in the specification do not necessarily all refer to the same embodiment.

In one embodiment, I/O priority inversions are addressed using an I/O scheduling system that enables rescheduling of a previously dispatched I/O request when the system detects a priority inversion caused by an I/O request. In response to detecting the priority inversion, a command can be transmitted to expedite the completion of the blocking request. In response to receiving the command, the request is expedited using one of several methods of reducing the pendency period of the request. When the expedited request is completed, the blocked process may access the resource.

In one embodiment, the detecting of the priority inversion can comprise receiving a first I/O request associated with the first task, mapping a resource to a first virtual memory region of the first task, transmitting a request to a storage device to perform a first operation at the first priority, locking the resource on behalf of the first task until the completion of the first operation, receiving an access request from the second task to access memory associated with the resource, and after determining that the resource is busy, transmitting an expedite command to the storage device including a resource tag and an expedite priority.

In one embodiment, the memory associated with the resource may be a second virtual memory region mapped to the resource, and the resource may be marked busy while the first operating is pending, and the second task may be denied access to the resource while the resource is busy. The method can further include determining if the second task is blocked from execution pending access to the resource, and transmitting the expedite command to the storage device in response to determining that the second task is blocked.

In one embodiment, a system can include multiple electronic components, including one or more processors coupled to a storage device and a memory device, to perform operations for managing input/output (I/O) requests to the storage device. The operations include, in response to receiving a first I/O request associated with a first task having a first priority, mapping a resource to a first virtual memory region of the first task, transmitting, to the storage device, the first request at the first priority, and locking a resource on behalf of the first task until after completion of the first request. The operations can additionally include, after locking a resource in behalf of the first task, receiving a memory access request from a second task having a second priority to access the resource. Moreover, the operations can include, after determining that the resource is busy, transmitting an expedite command to the storage device to increase the priority of the first request. In one embodiment, increasing the priority of the first request comprises moving at least a first operation related to the first I/O request from a first queue to a second queue.

In one embodiment, the data processing system storage device includes a memory system comprising multiple electrically erasable semiconductor memory arrays to store data, a storage processor coupled to the memory, and a command interface to receive multiple prioritized access requests for the memory. In one embodiment, the storage device additionally comprises a read/write unit to read and write data from multiple semiconductor memory arrays, wherein the read/write unit provides concurrent access to multiple semiconductor memory arrays.

In one embodiment, the storage device additionally includes a set of queues. The set of queue can include a first queue and a second queue and the multiple memory requests received by the command interface can be assigned to a queue based on the priority of the access request. The first queue can be associated with a first priority and the second queue can be associated with a second priority. In one embodiment, the storage processor expedites one or more of the multiple prioritized access requests based on an expedite command by transferring the one or more requests from the first queue to the second queue. In one embodiment, the set of queues includes a weighted deadline queue, and the storage processor is further to change the deadline of the request in response to an expedite command. In one embodiment, the storage device additionally comprises a latency expectation table and the storage processor is configured to adjust a latency expectation associated with the request in response to the expedite command.

It will be evident, however, that various modifications and changes can be made to the embodiments described, and it will be apparent to those skilled in the art that many further modifications and adaptations can be made without departing from the spirit of the concepts set forth herein. Accordingly, the scope of the invention is not to be determined or limited by the specific examples provided above but only by the claims below.

What is claimed is:

1. A computer-implemented method in an electronic data processing system having a prioritized I/O subsystem, the method comprising:
    detecting a priority inversion associated with an input/output (/I/O) request to the I/O subsystem of the electronic data processing system, wherein the request is from a first task having a first processor priority, and the request is blocking execution of a second task having a second processor priority that is higher than the first processor priority, wherein detecting the priority inversion comprises:
        receiving a first request associated with the first task to access data on a storage device;
        mapping a resource to a first virtual memory region of the first task; and
        transmitting a request to the storage device to perform a first operation at the first processor priority on behalf of the first task;
    in response to the detecting, transmitting a command to the I/O subsystem to expedite completion of the request;
    locating the request in the I/O subsystem in response to receiving the command; and
    expediting the request within the I/O subsystem while the request is pending completion.

2. The method of claim 1, wherein detecting the priority inversion further comprises:;
    marking the resource as busy until the completion of the first operation;
    receiving an access request from the second task to access memory associated with the resource; and after determining that the resource is busy, transmitting an expedite command to the storage device including a resource tag and an expedite priority.

3. The method as in claim 2, wherein the memory associated with the resource is a second virtual memory region mapped to the resource.

4. The method as in claim 3, wherein the first virtual memory region and the second virtual memory regions at least partially overlap.

5. The method of claim 2, further comprising configuring the storage device to store results of the request in the resource and locking the resource.

6. The method of claim 2, further comprising:
in response to receiving the request from the second task to access the resource, denying the second task the access to the resource when the resource is busy;
determining if the second task is blocked from execution pending access to the resource; and
transmitting the expedite command to the storage device in response to determining that the second task is blocked.

7. The method of claim 1, wherein expending the request comprises changing a completion deadline for the request in a weighted deadline queue.

8. The method of claim 1, wherein expediting the request comprises moving at least a first operation related to the request from a first queue to a second queue.

9. A system comprising:
a memory device;
a storage device coupled to the memory device;
one or more processors coupled to the storage device and the memory device, to perform operations for managing input/output (I/O) requests to the storage device, the operations including:
in response to receiving a first I/O request associated with a first task having a first priority, mapping a resource to a first virtual memory region of the first task, transmitting to the storage device the first request at the first priority, and marking the resource as busy;
after transmitting the first request, receiving a memory access request from a second task having a second priority to access the resource; and
after determining that the resource is busy, transmitting an expedite command to the storage device to increase the priority of the first request.

10. The system as in claim 9, wherein increasing the priority of the first request comprises moving at least one I/O operation related to the first request from a first queue to a second queue.

11. The system as in claim 9, wherein the storage device is an electronically erasable semiconductor memory storage device.

12. The system of claim 11, wherein the storage device supports out of order command completion.

13. The system as in claim 12, wherein the storage device includes a set of weighted deadline priority queues.

14. The system as in claim 13, wherein the expedite command causes the storage device to change a completion deadline for the at least one I/O operation related to the first request.

15. The system as in claim 12, wherein the storage device includes a memory system comprising:
electrically erasable semiconductor memory to store data;
a command interface to receive multiple prioritized access requests for the memory; and
a storage processor coupled to the memory, to expedite one or more of the multiple prioritized access requests in response to the expedite command.

16. The system as in claim 9, wherein the expedite command is transmitted only if the second priority is higher than the first priority.

17. The system as in claim 9, wherein the processor is to perform further operations including receiving a second I/O request associated with the second task having the second priority.

18. The system as in claim 17, wherein the second I/O request is at least partially dependent on the first request.

19. A storage device comprising:
a memory, to store data;
a command interface coupled to the memory, to receive multiple requests for data stored in the memory, wherein each of the multiple requests includes a priority;
a set of queues including at least a first queue and a second queue, wherein each request of the multiple requests received by the command interface are assigned to a queue in the set of queues based on the priority of the request, wherein the first queue is associated with a first priority and the second queue is associated with a second priority; and
a storage processor coupled to the memory, to perform operations on the memory in response to the requests, wherein the storage processor, in response to an expedite command to expedite a first request of the first priority, expedites the request to reduce a pendency period of the request, wherein the expedite command includes an expedite priority, and wherein the storage processor is further to transfer the request to the queue associated with the expedite priority.

20. The device of claim 19, wherein the expedite command includes a tag associated with the request, wherein the storage processor is further to locate the request using the tag while the request is pending on the storage processor.

21. The device of claim 19, further comprising a read/write unit to read and write data from multiple semiconductor memory arrays, wherein the read/write unit provides concurrent access to multiple semiconductor memory arrays.

22. The device of claim 19, further comprising a latency expectation table, wherein the storage processor is to adjust a latency expectation associated with the request in response to the expedite command.

23. The device of claim 19, wherein the set of queues includes a weighted deadline queue, and wherein the storage processor is further to change the deadline of the request in response to an expedite command.

24. The device of claim 23, wherein the storage processor is further to cause the deadline of the request to expire.

25. The device of claim 19, wherein the memory is an electrically erasable semiconductor memory.

* * * * *